(12) United States Patent
Nakamura (10) Patent No.: US 6,418,418 B1
(45) Date of Patent: Jul. 9, 2002

(54) TRANSACTION INFORMATION PROCESSING SYSTEM

(75) Inventor: Masataka Nakamura, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/224,796

(22) Filed: Dec. 13, 1998

(30) Foreign Application Priority Data

Mar. 20, 1998 (JP) .......................................... 10-072804

(51) Int. Cl.$^7$ ............................................... G06F 17/60

(52) U.S. Cl. ............................ 705/35; 705/39; 705/44; 705/26; 705/35; 705/42; 705/43

(58) Field of Search ............................... 705/39, 44, 26, 705/35, 42, 43

(56) References Cited

U.S. PATENT DOCUMENTS

| | | | | |
|---|---|---|---|---|
| 4,757,525 A | * | 7/1988 | Matthews et al. | 379/89 |
| 5,893,907 A | * | 4/1999 | Ukuda | 705/35 |
| 6,012,144 A | * | 1/2000 | Pickett | 713/201 |
| 6,018,724 A | * | 1/2000 | Arent | 705/44 |
| 6,023,682 A | * | 2/2000 | Checchio | 705/18 |
| 6,018,708 A | * | 6/2000 | Dahan et al. | 704/244 |

FOREIGN PATENT DOCUMENTS

| | | | | |
|---|---|---|---|---|
| EP | 0 598 469 A | * | 4/1993 | G07F/7/10 |
| WO | 97/04579 | * | 4/1993 | G06F/17/60 |

OTHER PUBLICATIONS

Farmer, David and Fleming, Sue; Digital Delivers on Agreement with AT&T to Integrate Voice and Data; Business Wire; s1; p1, Feb. 6, 1990.*

Cu–Uy–Gam, Miriam; IVR Systems Speak Volumes for Service Providers; Financial Post (Toronto); s1; p27, Nov. 7, 1992.*

Your new computer: The telephone: Voice Processing puts a powerful tool at everyone's fingertips Maurice Vellekoop; Business Week; No, 3216; p126, Jun. 3, 1991.*

Olympia, P,I,; Computer telephony and interactive voice response; part 1; (Technological Tutorial); v8;n12; p72(4), Nov. 1995.*

Speech recognition solutions: Speaking your mind; Infoword; p92, Nov. 17, 1995.*

* cited by examiner

Primary Examiner—Robert W. Downs
Assistant Examiner—Pedro R. Kanof
(74) Attorney, Agent, or Firm—Rabin & Champagne, P.C.

(57) ABSTRACT

An information processing system for transactions by telephone of the present invention comprises a receiving terminal, operated by an operator, for inputting information from a customer taken over a telephone, storage means for storing information necessary in repeated transactions, and a voice recognition device having a voice recognition unit for recognizing specific vocabulary spoken by a customer or a voice response device having a push button signal recognition unit for confirming a push button signal generated by customer operations of push buttons of a telephone, wherein, for repeated transactions, a transaction name or transaction code arbitrarily designated by a customer at the time of a transaction beforehand or for the first time and information relating to this transaction name or transaction code are stored at a storage means in such a manner as to correspond with each other. In transactions thereafter, a transaction name designated by the customer over the telephone or a transaction code inputted using the push buttons is recognized by a voice recognition unit of the voice response device or by the push button signal recognition unit. Information relating to this transaction name or transaction code is then retrieved from the storage means, transferred to the receiving terminal, and is put in order as information necessary for the transaction.

10 Claims, 8 Drawing Sheets

FIG. 1

| Transaction name | Transfer source account information | Transfer destination account information | Transfer type |
|---|---|---|---|
| Rent | 100110-1234567 | 100200-9876543 | Deposit transfer |
| Allowance | 100110-1234567 | 100300-2345678 | Account to account transfer |
| Cram school | 100110-1234567 | 100410-3456789 | Account to account transfer |

| Transaction code | Transfer source account information | Transfer destination account information | Transfer type |
|---|---|---|---|
| 1 | 100110-1234567 | 100200-9876543 | Deposit transfer |
| 10 | 100110-1234567 | 100300-2345678 | Account to account transfer |
| 2 | 100110-1234567 | 100410-3456789 | Account to account transfer |

TRANSACTION INFORMATION PROCESSING SYSTEM

BACKGROUND OF THE INVENTION

1. Field of the Invention

The present invention relates to a system for processing information required while executing transactions at a financial institution such as a bank using a telephone.

2. Description of Related Art

At financial institutions such as banks, transactions by telephone are received from customers and the transactions are executed based on information obtained from the customer. For example, designating the account of the customer making the telephone call to be a transfer source account and designating another account as a destination account, a transaction for transferring funds of the transfer source account to the transfer destination account by transferring deposited funds or making an account-to-account transfer, is executed. When this kind of related funds transfer transactions take place by telephone, the customer gives all the information required for the transaction to the operator by speaking, with the operator then inputting this information to a terminal device and executing the transaction. Alternatively, the customer can operate push buttons of the telephone to cause a PB (Push Button) signal for part of the information required for the transaction to be generated, with this information being recognized at a PB signal recognition unit on the side of the financial institution, the information being then arranged and the transaction then being executed. However, with the above related method, all of the information required in the transaction has to be successively told to the operator for every transaction, or alternatively, it is necessary to operate the push buttons of the telephone to input signals. The number of customer and operator information input operations is therefore large and the transaction processing is time consuming.

SUMMARY OF THE INVENTION

The object of the present invention is to provide an information processing system for transactions by telephone capable of reducing the customer transaction contents transmission load and the number of operator information input operations, and shortening transaction processing time.

An information processing system for transactions by telephone of the present invention comprises a receiving terminal, operated by an operator, for inputting information from a customer taken over a telephone, storage means for storing information necessary in repeated transactions, and a voice recognition device having a voice recognition unit for recognizing a specific vocabulary spoken by a customer, or a voice response device having a PB signal recognition unit for confirming a PB signal generated by customer operations of push buttons of a telephone, wherein, for repeated transactions, a transaction name or transaction code arbitrarily designated by a customer at the time of a transaction beforehand or for the first time, and information relating to this transaction name or transaction code, are stored by a storage means in such a manner as to correspond with each other. In transactions thereafter, a transaction name designated by the customer over the telephone or a transaction code inputted using the push buttons is recognized by a voice recognition unit of the voice response device or by the PB signal recognition unit. Information relating to this transaction name or transaction code is then retrieved from the storage means, transferred to the receiving terminal, and put in order as information necessary for the transaction.

DETAILED DESCRIPTION OF THE PREFERRED EMBODIMENTS

The following is a description of the embodiments of an information processing system for transactions by telephone of the present invention.

First Embodiment

Figure 1:
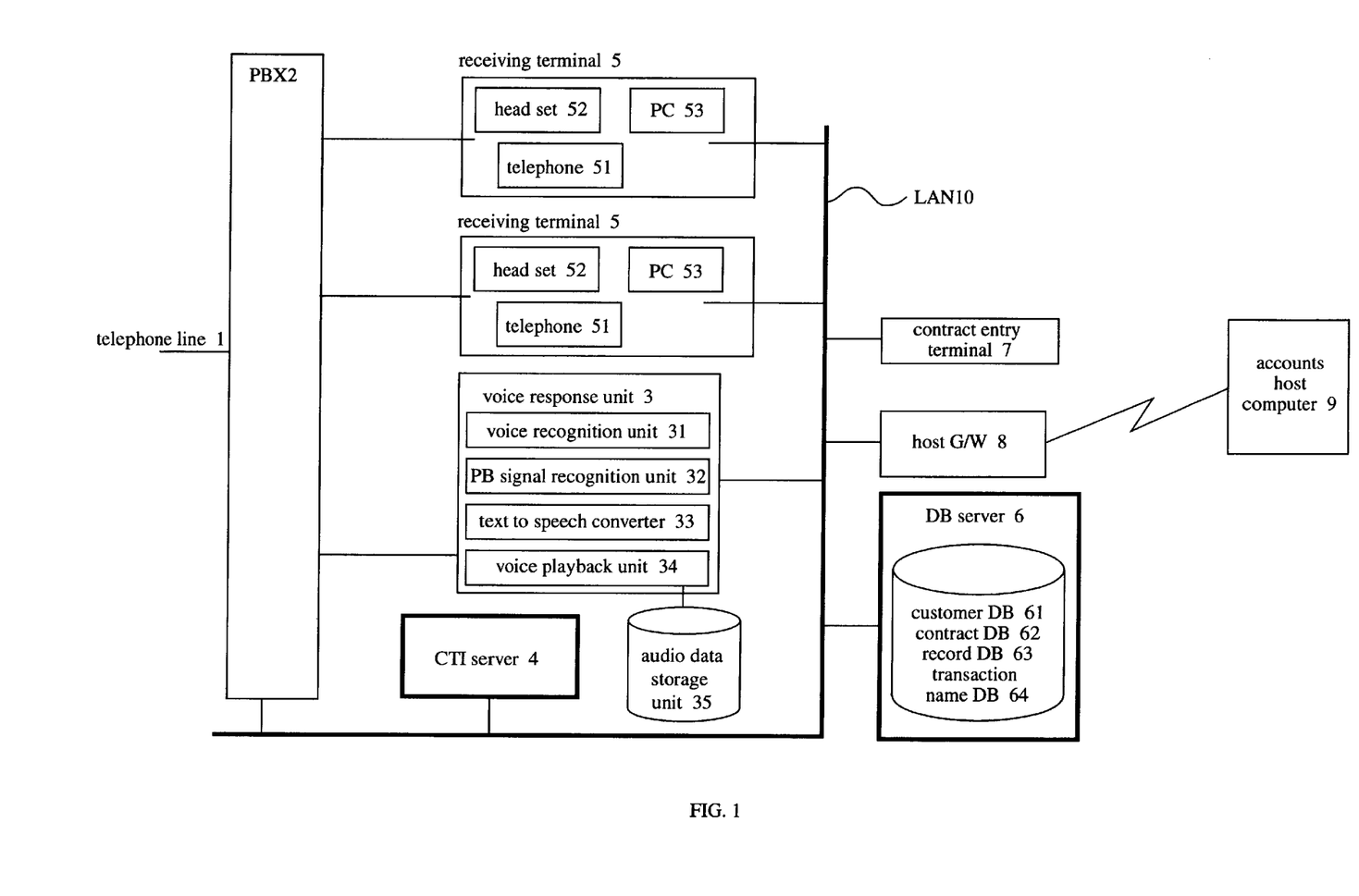
FIG. 1 is a system block view showing a first embodiment.

FIG. 1 is a system configuration view showing the first embodiment.

In FIG. 1, numeral 1 designates a telephone line, numeral 2 designates a PBX (Private Branch Exchange), numeral 3 designates an voice response unit, numeral 4 designates a CTI (Computer Telephone Integration) server, numeral 5 designates a receiving terminal, numeral 6 designates a DB (DATA BASE) server, numeral 7 designates a contract entry terminal, numeral 8 designates a host G/W (GATEWAY), numeral 9 designates an accounts host computer, and numeral 10 designates a LAN (LOCAL AREA NETWORK) where the voice response unit 3 and receiving terminal 5 are connected to the PBX 2. The PBX 2, voice response unit 3, CTI server 4, receiving terminal 5, DB server 6, contract entry terminal 7 and host G/W 8 are connected by the LAN 10 in order to carry out mutual communications, with the host G/W 8 being connected to the accounts host computer 9.

In this system, a telephone call from a customer is then connected to the voice response unit 3 and the receiving terminal 5 via a telephone line 1 and the PBX 2.

The voice response unit is equipped with a voice recognition unit 31, a PB signal recognition unit 32, a text-to-voice converter 33, a voice playback unit 34 and an audio data storage unit 35. The voice response unit 3 has a function for recognizing, using the PB signal recognition unit 32, numbers inputted as PB sounds generated by the customer inputting numbers using the push buttons of the telephone. The voice response unit 3 also has a function for comparing specific vocabulary within voice spoken by the unspecified customer over the telephone with pre-registered words using the voice recognition unit 31 and recognizing such words. The customer can then be given audio guidance by combining these recognition functions and the voice playback unit 34. The business of the customer can be analyzed from the resulting replies, and input operations of the customer and identity confirmation etc. can be carried out by confirming the presence of the identified person by comparing a contractor number with a code number inputted by the customer using the buttons of the telephone, using a contractor DB to be described later.

The text reader 33 is for playing back the language spoken by the customer on the telephone as necessary and is used in order to communicate this to the customer but is not particularly essential to the present invention.

The CTI server 4 is a device that makes the PBX 2 work together with the voice response unit 3 and receiving terminal 5. The CTI server 4 has a function for selecting an operator in response to results when processing for business analysis and personal identity confirmation is carried out at the voice response unit 3 and connecting a telephone call from a customer to the receiving terminal 5 operated by this operator. The CTI server 4 has a further function for operating the PBX 2 and the DB server 6 in unison, utilizing a Caller ID service and determining the customer that is calling from the telephone number from which the call is made.

The receiving terminal 5 operates in unison with the DB server 6 and is used for executing various customer transactions. The receiving terminal 5 comprises a telephone 51, a head set 52 to enable the operator to talk to the customer via the telephone 51 and a PC (Personal Computer) 53 having a function for linking the computer and PBX and a function for executing business applications etc. Account information and telephone business etc. sent from the voice response unit 3 and the DB server 6 are displayed at the display of this PC 53 in addition to information input by the operator.

Figure 2:
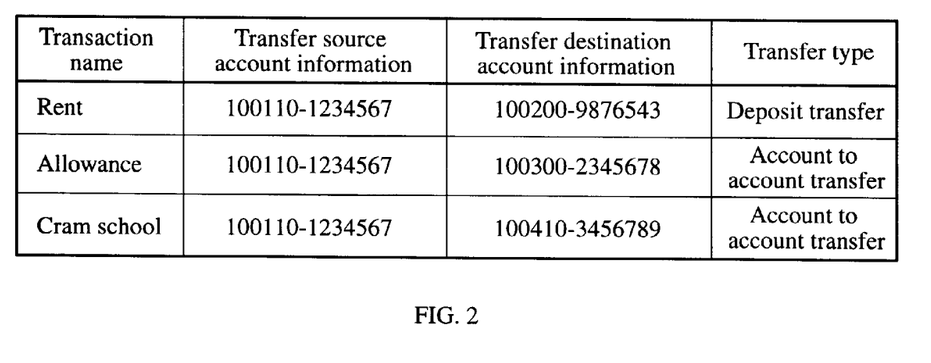
FIG. 2 is a view showing an example of the storage contents of a transaction name DB (DATA BASE) of the first embodiment.

The DB server 6 comprises a customer DB 61 for storing information such as the customer's full name and address etc., a contract DB 62 for storing information such as a contractor number, code number, and account number used in transactions applied for by the customer at the time of making the contract in order to execute transactions by telephone, record DB 63 for storing various information regarding transaction results, and a transaction name DB 64 used as a storage means for storing information such as a transaction name arbitrarily designated by the customer as shown in FIG. 2, and corresponding information relating thereto. The contract entry terminal 7 is used for inputting and maintaining information such as the contractor number and code number etc. stored in the contract DB 62 of the DB server 6.

The host G/W 8 is used for carrying out communications between the accounts host computer 9 and the voice response unit 3 and receiving terminal 5 in the case when business occurs where it is necessary to refer to or update a DB (not shown) provided on the side of the accounts host computer 9 in order to carry out transactions such as the transfer of funds by telephone or in order to execute transactions.

FIG. 2 is a view illustrating the storage contents of the transaction name DB 64 of the DB server 6.

Here, the case of an electronic funds transfer transaction is shown and therefore a transaction name and corresponding transfer source account number, transfer destination account number, and transfer type, such as deposit transfer or account-to-account transfer etc., are stored.

The operation of the above configuration will now be described.

This description gives the example of the case where an electronic funds transfer transaction is carried out as a transaction by telephone.

In this embodiment electronic funds transfer transactions are divided into two types, first-time electronic funds transfer transactions, and electronic funds transfer transactions that are carried out after the first-time (transactions of the same transfer source and destination).

Figure 3:
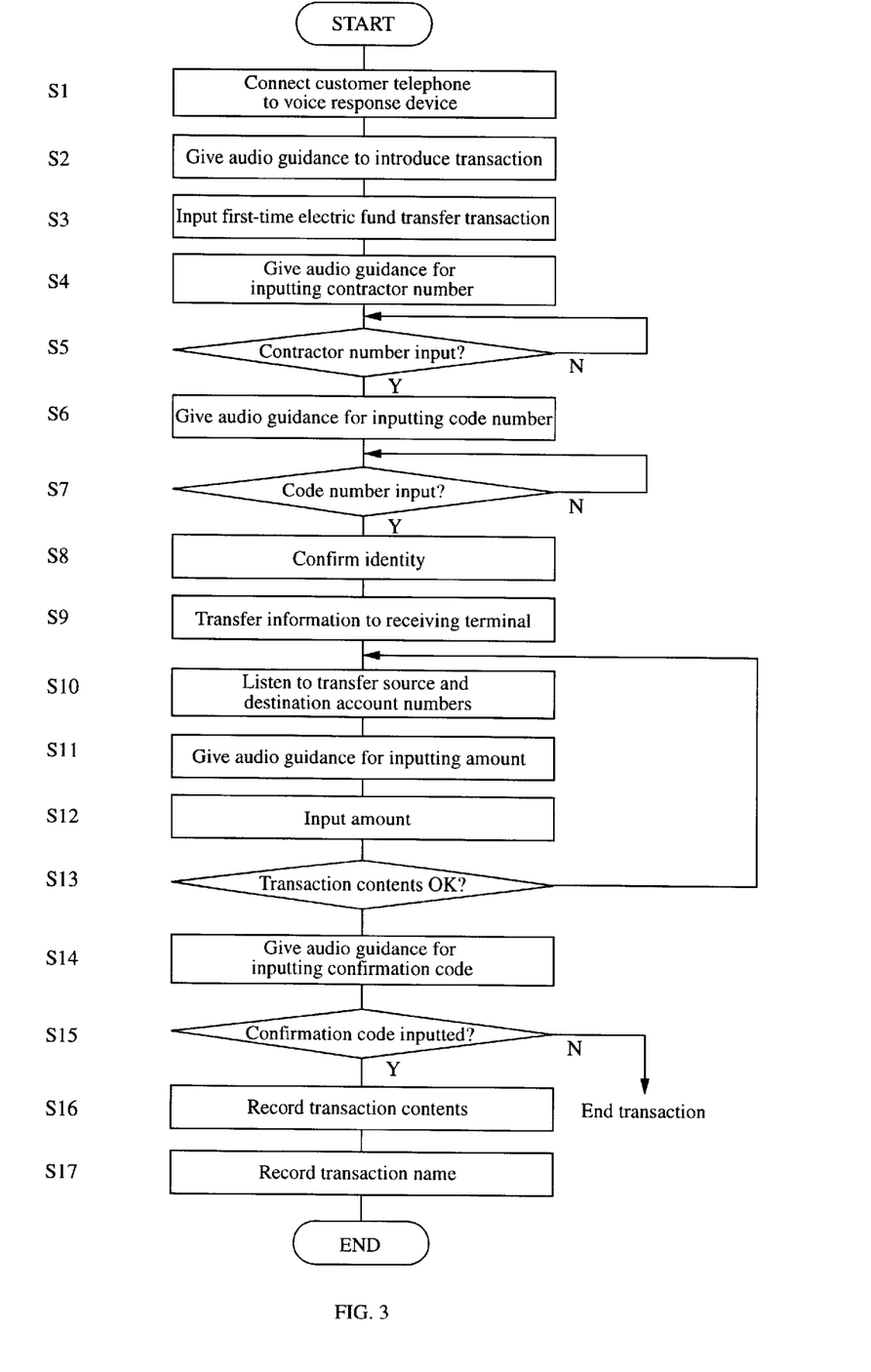
FIG. 3 is a flowchart showing a first time operation of the first embodiment.
Figure 4:
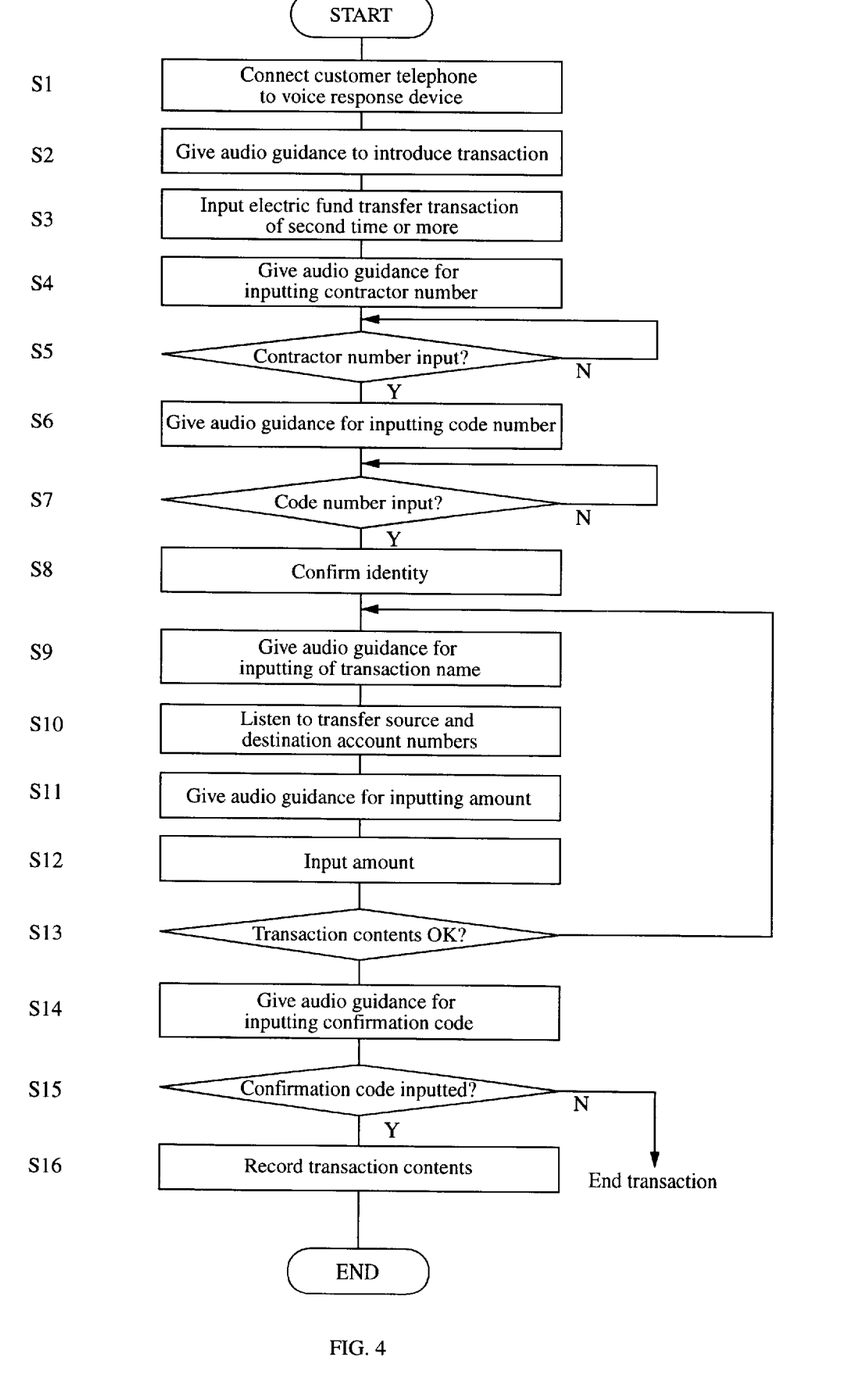
FIG. 4 is a flowchart showing a subsequent operation of the first embodiment.

FIG. 3 is a flowchart showing a first-time electronic funds transfer transaction and FIG. 4 is a flowchart showing a electronic funds transfer transaction of a second or late time.

First, a first-time electronic funds transfer transaction is described.

A telephone call made by a customer in order to perform a transaction is connected from the telephone line 1 to the voice response unit 3 via the PBX 2 (S1) and the voice response unit 3 carries out audio guidance for introducing the transaction using the voice playback unit 34 (S2).

Namely, the voice playback unit 34 of the voice response unit 3 sequentially extracts transaction type data including ※ first-time electronic funds transfer transaction ※ and electronic funds transfer transaction of a second or subsequent time ※ from the audio data storage unit 35. This is played back as voice by the voice playback unit 34, and guidance is given to the customer.

As a result of this, the customer selects ※ first-time electronic funds transfer transaction ※ and a number corresponding to the aforementioned transaction is inputted using the push buttons of the telephone (S3). This inputted number is then recognized by the PB signal recognition unit 32 and held as business information.

The voice playback unit 34 then sequentially extracts data inviting the inputting of the contractor number and the inputting of the code number from the audio data storage unit 35, plays this back as voice and gives guidance to the customer (S4), (S6).

When the customer inputs the contractor number and code number pre-registered using the push buttons of the telephone (S5), (S7), these inputted numbers are recognized by the PB signal recognition unit 32.

The inputted contractor number and code number are then compared with a contractor number and code number pre-stored in the contract DB 62 of the DB server 6, and personal identification for determining whether or not this is the correct contractor is carried out (S8).

When the personal identification confirms that the contractor is legitimate, this contractor number and code number information is sent to the CTI server 4 together with the business information, so that the CTI server 4 selects the operator and the information is transferred to the receiving terminal 5 (S9).

The receiving terminal 5 then displays the information from the CTI server 4 at the display of the PC 53 and the PBX 2 connects the telephone 51 of the receiving terminal 5 operating in unison with the CTI server 4, with the telephone of the customer.

The operator of the connected receiving terminal 5 then hears the necessary information such as the transfer source account number and transfer destination account number and the type of transfer such as a deposit transfer or account-to-account transfer from the customer, via the telephone 51 using the head set 52 (S10), and this is inputted to the PC 53 using a keyboard etc. (not shown).

Information for the customer address and full name etc. retrieved from the customer DB 61, is then displayed at the display of the PC 53 for the operator to refer to.

The operator then connects the telephone directly to the voice response unit 3 in order that the amount to be transferred by the customer can be inputted, and the customer is invited using the voice playback unit 34 to input an amount (S11).

When the customer inputs the amount using the push buttons of the telephone in this way (S12), this number is recognized by the PB signal recognition unit 32 and a direct connection is made with the source receiving terminal 5.

The operator then reads out the transaction contents such as the transfer source account number, the transfer destination account number, the transfer type, and the amount and confirmation of the transaction contents is obtained from the customer (S13).

If the contents are incorrect, information such as the transfer source account number and the transfer destination account number is listened to (S10), and the amount is inputted (S11), (S12).

If there are no errors in the transaction contents, the operator operates the keyboard in such a manner that the telephone call of the customer is again connected by the PBX 2 to the voice response unit 3.

As a result, the voice response unit 3 gives guidance to the customer, using the same method as for inputting the amount, to invite the customer to indicate whether or not the transaction is to be permitted (S14). When, as a result, the customer inputs a cancel code using the telephone push buttons, this transaction is canceled and the process is complete. When the customer inputs a confirmation code using the push buttons of the telephone (S15), the PB signal recognition unit 32 recognizes this input code and the receiving terminal 5 is notified.

The transaction contents are then sent from the receiving terminal 5 to the accounts host computer 9 via the host G/W 8, and the transaction is then executed by the accounts host computer 9.

The transaction contents from the receiving terminal 5 are also transferred to the DB server 6 and registered at the record DB 63 (S16). At this time, a receipt number acquired by the receiving terminal 5 from the DB server 6 is displayed on the screen of the PC 53. The operator then looks at this and informs the customer of the receipt number.

The operator then confirms from the customer whether or not funds are to be transferred from the same transfer source account to the same transfer destination account thereafter. If a response that this is the case is obtained, and arbitrary transaction name is given by the customer and the operator inputs this name using the keyboard. This transaction name is then transferred to the DB server 6 together with the information of the transfer source account number, transfer destination account number and transfer type information, and recorded in the transaction name DB 64 as the information shown in FIG. 2 (S17).

A electronic funds transfer transaction receipt is then sent by mail the following day so that the customer can confirm the contents of the transaction of this name.

Next, a description is given using the flowchart shown in FIG. 4 of electronic funds transfer transactions for the second time onwards using the same transfer source account and transfer destination account.

With the second or subsequent electronic funds transfer transactions for the same transfer source account and transfer destination account, first, a telephone call made by a customer in order to perform a transaction, is connected from the telephone line 1 to the voice response unit 3 via the PBX 2 (S1), and the voice response unit 3 carries out audio guidance introducing the transaction using the voice playback unit 34 (S2).

Namely, the voice playback unit 34 of the voice response unit 3 sequentially extracts transaction type data, including ※ first time electronic funds transfer transaction ※ and ※ second or subsequent time electronic funds transfer transactions ※ from the audio data storage unit 35, this is played back as voice by the voice playback unit 34, and guidance is given to the customer.

As a result of this, the customer selects ※ second and subsequent electronic funds transfer transaction ※ and a number corresponding to the aforementioned transaction is inputted using the push buttons of the telephone (S3). This inputted number is then recognized by the PB signal recognition unit 32.

The voice playback unit 34 then sequentially extracts data inviting the inputting of the contractor number and the inputting of the code number from the audio data storage unit 35, plays this back as a voice, and gives guidance to the customer (S4), (S6).

When the customer inputs the contractor number and code number pre-registered using the push buttons of the telephone (S5), (S7), these inputted numbers are recognized by the PB signal recognition unit 32.

The inputted contractor number and code number are then compared with a contractor number and code number pre-stored in the contract DB 62 of the DB server 6, and personal identification for determining whether or not this is the correct contractor is carried out (S8).

After this, the voice playback unit 34 extracts data from the audio data storage unit 35 inviting the inputting of a transaction name using voice, with this being played back as voice so as to give guidance to the customer (S9).

When the customer then responds by telephone with the transaction name, the voice recognition unit 31 then recognizes this voice-inputted transaction name.

The voice response unit 3 then obtains the transfer source account number and the transfer destination account number etc. from the DB server 6 based on this transaction name. The DB server 6 then retrieves a transfer source account number and a transfer destination account number etc. corresponding to the transaction name from the transaction name DB 64 and transfers this information to the voice response unit 3 (S10).

The voice playback unit 34 extracts data inviting the customer to input an amount from the audio data storage unit 35, this data is played back as voice, and guidance is given to the customer (S11).

When the customer inputs the amount using the push buttons of the telephone in this way (S12), this number is recognized by the PB signal recognition unit 32.

After this, the voice playback unit 34 sends each item of inputted information to the CTI server 4, and the CTI server 4 selects an appropriate operator based on this information. Each item of information received via the voice playback unit 34 is then transferred to the receiving terminal 5 of the selected operator. The receiving terminal 5 receiving this information displays each item of information from the CTI server 4 at the display of the PC 53, and the PBX 2 connects the telephone 51 of the receiving terminal 5 operating in unison with the CTI server 4 and the customer telephone.

Information such as the full name and address of the customer retrieved from the customer DB 61 is then displayed at the display of the PC 53 and the operator then refers to this information.

At this time, the information for the transfer source account number, transfer destination account number and transfer amount etc. that are to be designated by the customer carrying out the transaction, are all gathered together. The operator then reads out the transaction contents using this information and obtains confirmation from the customer (S13).

If the contents are incorrect, the transaction name is inputted again using voice (S9) (S10) and/or the amount is inputted (S12), (S13).

If there are no errors in the transaction contents, the operator operates the keyboard in such a manner that the telephone call of the customer is again connected to the voice response unit 3 by the PBX 2.

As a result, the voice response unit 3 gives guidance to the customer, using the same method as for inputting the amount, to invite the customer to indicate whether or not the transaction is to be permitted (S14). When, as a result, the customer inputs a cancel code using the telephone push buttons, this transaction is canceled and the process is complete. When the customer inputs a confirmation code using the push buttons of the telephone (S15), the PB signal recognition unit 32 recognizes this input code and the receiving terminal 5 is notified.

The transaction contents are then sent from the receiving terminal 5 to the accounts host computer 9 via the host G/W 8 and the transaction is then executed by the accounts host computer 9.

The transaction contents from the receiving terminal 5 are also transferred to the DB server 6 and registered at the record DB 63 (S16). At this time, a receipt number acquired by the receiving terminal 5 from the DB server 6 is displayed on the screen of the PC53. The operator then looks at this and informs the customer of the receipt number, and the process is complete.

According to the first embodiment described above, the transactions from the second time onwards can proceed without the customer informing the operator of information relating to the transaction code and it is not necessary for the operator to input information relating to the transaction name using the keys. The number of information input operations for the customer and the operator can therefore be reduced and the amount of switching of connections to the receiver terminal for the customer telephone can be reduced. The corresponding operator time and the transaction processing time can then be reduced.

Second Embodiment

Figure 5:
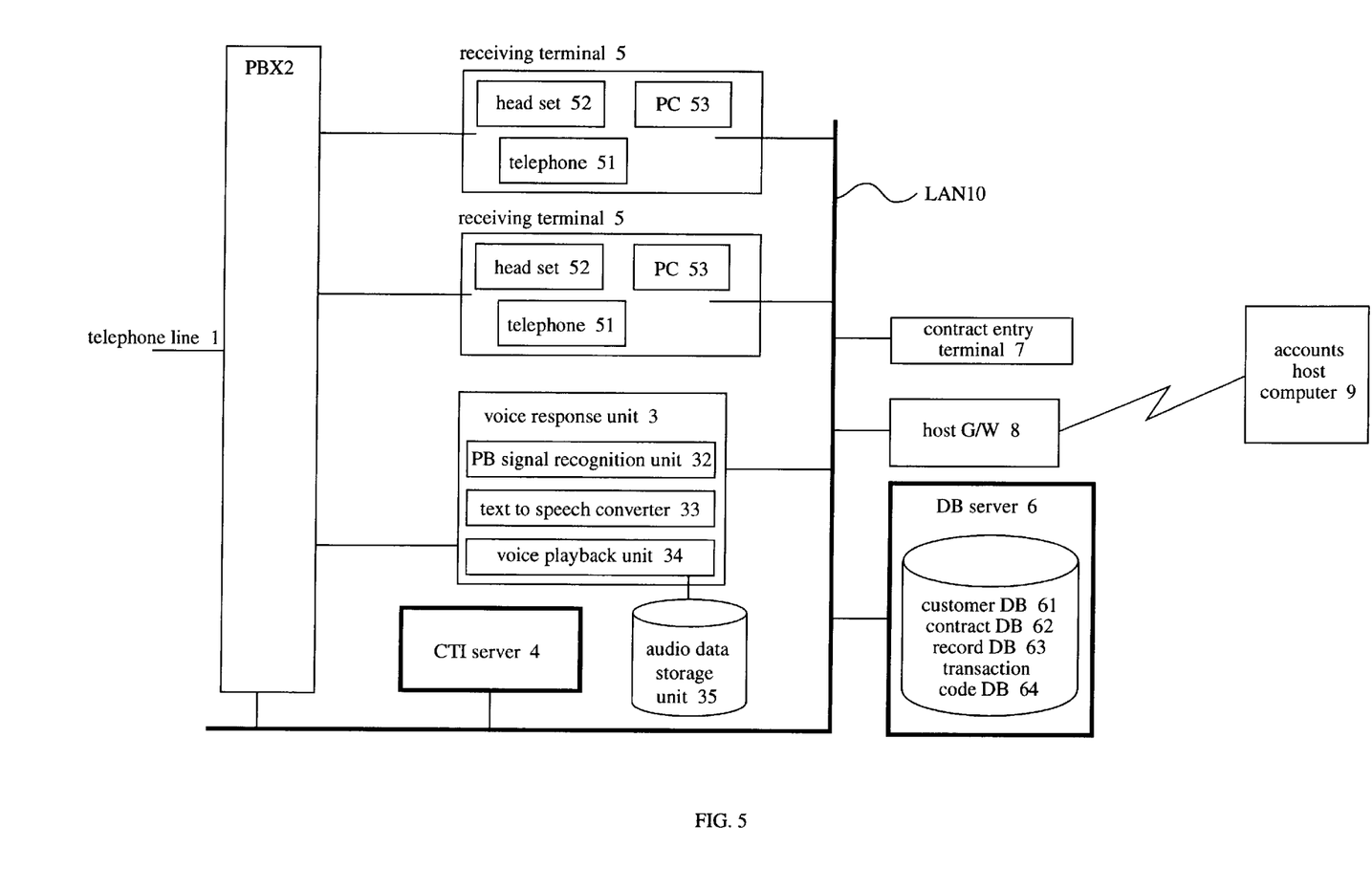
FIG. 5 is a system block view showing a second embodiment.

FIG. 5 is a system configuration view showing a second embodiment.

In the second embodiment, portions that employ the voice recognition unit 31 in the first embodiment now carry out operations using the PB signal recognition unit 32. Other than the voice response unit 3 being constructed from the PB signal recognition unit 32, text reader 33 and voice playback unit 34, the system is configured of the same structural elements as for the first embodiment. However, the transaction name DB 64 of the first embodiment is replaced by a transaction code DB 65 at the DB server.

Figure 6:
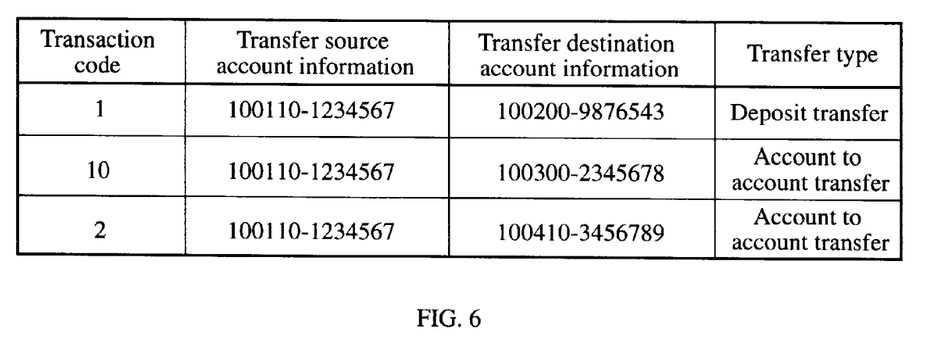
FIG. 6 is a view showing an example of the storage contents of the transaction code DB of the second embodiment.

FIG. 6 is a view illustrating the storage contents of the transaction code DB 65 of the DB server 6.

Here an example is shown of a electronic funds transfer transaction, with a transfer source account number, transfer destination account number, and transfer type such as transfer of deposited funds or account to account transfer etc. being stored in such a manner as to correspond with the transaction code.

The operation of the above configuration is now described.

In this embodiment electronic funds transfer transactions are divided into two types in the same way as for the first embodiment, i.e., first time electronic funds transfer transactions and electronic funds transfer transactions that are carried out for a second time or subsequent (transactions of the same transfer source and destination).

Figure 7:
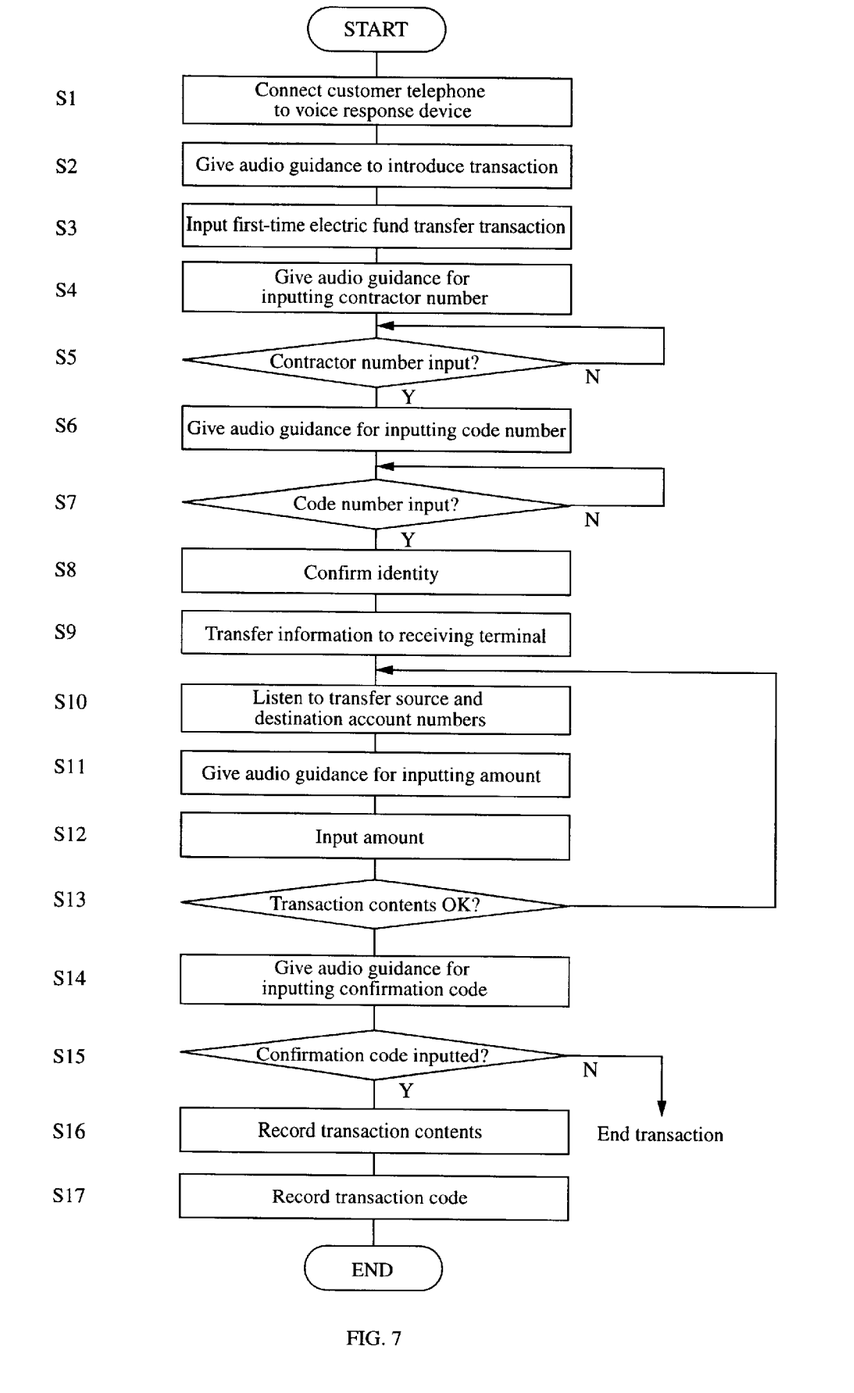
FIG. 7 is a flowchart showing a first time operation of the second embodiment.
Figure 8:
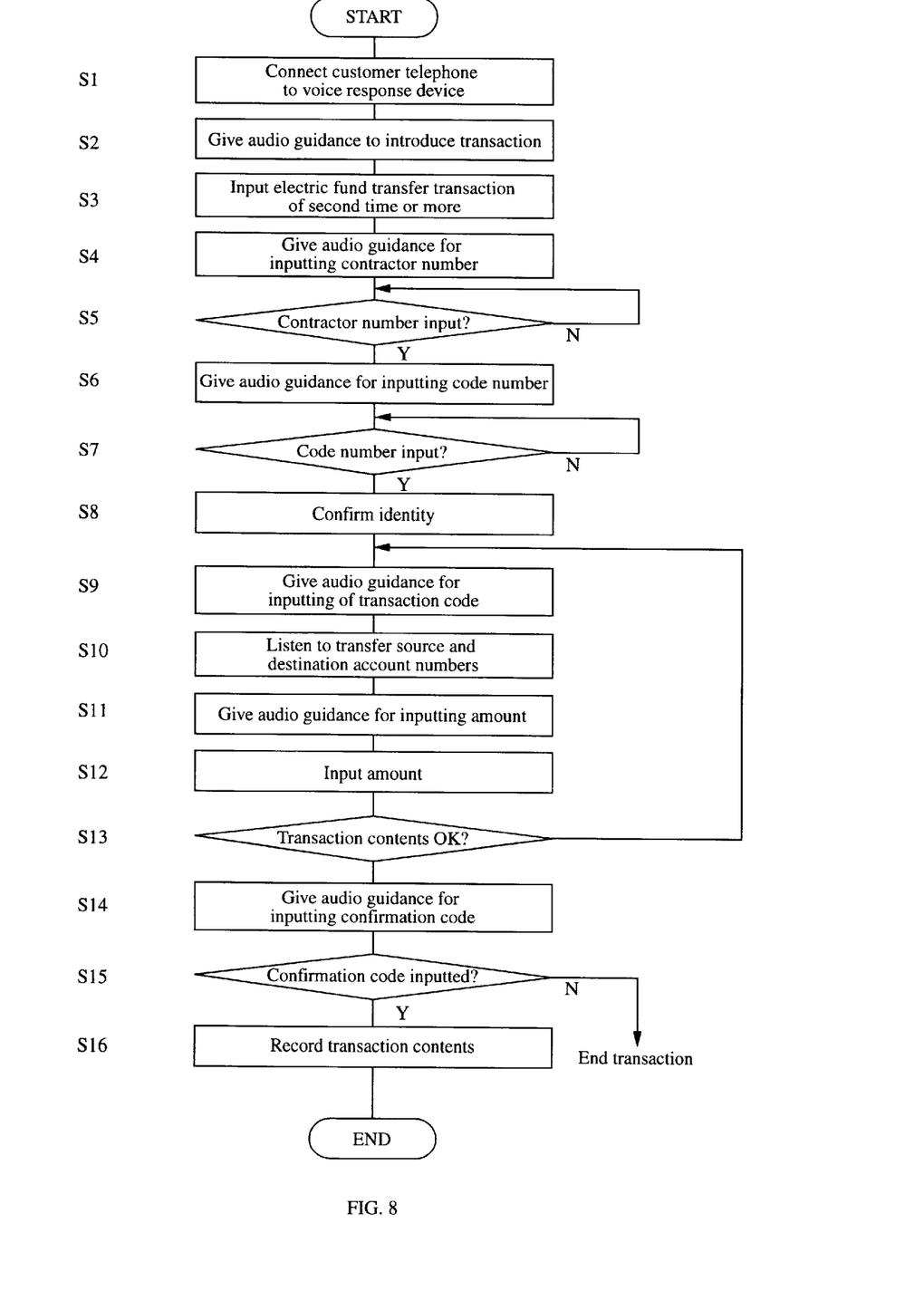
FIG. 8 is a flowchart showing a subsequent operation of the second embodiment.

FIG. 7 is a flowchart showing a first time electronic funds transfer transaction and FIG. 8 is a flowchart showing a second or subsequent electronic funds transfer transaction.

First, a first time electronic funds transfer transaction is described.

A telephone call made by a customer in order to make a transaction is connected from the telephone line 1 to the voice response unit 3 via the PBX 2 (S1) and the voice response unit 3 carries out audio guidance introducing the transaction using the voice playback unit 34 (S2).

Namely, the voice playback unit 34 of the voice response unit 3 sequentially extracts transaction type data including ▒ first time electronic funds transfer transaction ▒ and second or subsequent time electronic funds transfer transaction ▒ from the audio data storage unit 35, this is played back as voice by the voice playback unit 34 and guidance is given to the customer.

As a result of this, the customer selects ▒ first time electronic funds transfer transaction ▒ and a number corresponding to the aforementioned transaction is inputted using the push buttons of the telephone (S3). This inputted number is then recognized by the PB signal recognition unit 32 and held as business information.

The voice playback unit 34 then sequentially extracts data inviting the inputting of the contractor number and the inputting of the code number from the audio data storage unit 35, plays this back as voice, and gives guidance to the customer (S4), (S6).

When the customer inputs the contractor number and code number pre-registered using the push buttons of the telephone (S5), (S7), these inputted numbers are recognized by the PB signal recognition unit 32.

The inputted contractor number and code number are then compared with a contractor number and code number pre-stored in the contract DB 62 of the DB server 6, and personal identification for determining whether or not this is the correct contractor is carried out (S8).

When a personal identification confirms that the contractor is legitimate, this contractor number and code number information is sent to the CTI server 4 together with the business information so that the CTI server 4 selects the operator and the information is transferred to the receiving terminal 5 (S9).

The receiving terminal 5 then displays the information from the CTI server 4 at the display of the PC 53, and the PBX 2 connects the telephone 51 of the receiving terminal 5, operating in unison with the CTI server 4 and the telephone of the customer.

The operator of the connected receiving terminal 5 then hears the necessary information such as the transfer source account number and transfer destination account number, and the type of transfer such as a deposit transfer or account-to-account transfer from the customer via the telephone 51 using the head set 52 (S10), and this is inputted to the PC 53 using a keyboard etc. (not shown).

Information for the customer address and full name etc. retrieved from the customer DB 61 is then displayed at the display of the PC 53 for the operator to refer to.

The operator then connects the telephone directly to the voice response unit 3 in order that the amount to be transferred by the customer can be inputted, and the customer is invited using the voice playback unit 34 to input an amount (S11).

When the customer inputs the amount using the push buttons of the telephone in this way (S12), this number is recognized by the PB signal recognition unit 32 and a direct connection is then made with the source receiving terminal 5.

The operator then reads out the transaction contents such as the transfer source account number, the transfer destination account number, the transfer type, and the amount and confirmation of the transaction contents is obtained from the customer (S13).

If the contents are incorrect, information such as the transfer source account number and the transfer destination account number is listened to (S10) and the amount is inputted (S11), (S12).

If there are no errors in the transaction contents, the operator operates the keyboard in such a manner that the telephone call of the customer is again connected to the voice response unit 3 by the PBX 2.

As a result, the voice response unit 3 gives guidance to the customer, using the same method as for inputting the amount, to invite the customer to indicate whether or not the transaction is to be permitted (S14). When, as a result, the customer inputs a cancel code using the telephone push buttons, this transaction is canceled and the process is complete. When the customer inputs a confirmation code using the push buttons of the telephone (S15), the PB signal recognition unit 32 recognizes this input code and the receiving terminal 5 is notified.

The transaction contents are then sent from the receiving terminal 5 to the accounts host computer 9 via the host G/W 8, and the transaction is then executed by the accounts host computer 9.

The transaction contents from the receiving terminal 5 are also transferred to the DB server 6 and registered at the record DB 63 (S16). At this time, a receipt number acquired by the receiving terminal 5 from the DB server 6 is displayed on the screen of the PC 53. The operator then looks at this and informs the customer of the receipt number.

The operator then confirms from the customer whether or not funds are to be transferred from the same transfer source account to the same transfer destination account thereafter. If a response that this is the case is obtained, an arbitrary transaction code consisting of, for example, one or two digits of numerical characters for designating the transaction is given by the customer and the operator inputs this name using the keyboard. This transaction code is then transferred to the DB server 6 together with the information of the transfer source account number, transfer destination account number and transfer type information, and recorded in the transaction code DB 65 as the information shown in FIG. 6 (S17).

A electronic funds transfer transaction receipt is then sent by mail the following day so that the customer can confirm the contents of the transaction of this code.

Next, a description will be given using the flowchart shown in FIG. 8 of the electronic funds transfer transaction taking place for a second or subsequent time.

With the second electronic funds transfer transaction onwards for the same transfer source account and transfer destination account, first, a telephone call made by a customer in order to make a transaction is connected from the telephone line 1 to the voice response unit 3 via the PBX 2 (S1), and the voice response unit 3 carries out audio guidance introducing the transaction using the voice playback unit 34 (S2).

Namely, the voice playback unit 34 of the voice response unit 3 sequentially extracts transaction type data including ▓ first time electronic funds transfer transaction ▓ and ▓ second or subsequent time electronic fund transfer transaction ▓ from the audio data storage unit 35, this is played back as voice by the voice playback unit 34, and guidance is given to the customer.

As a result of this, the customer selects ▓ or subsequent time electronic funds transfer transaction ▓ and a number corresponding to the aforementioned transaction is inputted using the push buttons of the telephone (S3). This inputted number is then recognized by the PB signal recognition unit 32.

The voice playback unit 34 then sequentially extracted data inviting the inputting of the contractor number and the inputting of the code number from the audio data storage unit 35, plays this back as voice, and gives guidance to the customer (S4), (S6).

When the customer inputs the contractor number and code number pre-registered using the push buttons of the telephone (S5), (S7), these inputted numbers are recognized by the PB signal recognition unit 32.

The inputted contractor number and code number are then compared with a contractor number and code number pre-stored in the contract DB 62 of the DB server 6, and personal identification for determining whether or not this is the correct contractor is carried out (S8).

After this, the voice playback unit 34 extracts data from the audio data storage unit 35 inviting the inputting of a transaction name using voice, with this being played back as voice so as to give guidance to the customer (S9).

As a result of this, when the customer then inputs the transaction code number using the push buttons of the telephone, this input code is recognized by the PB signal recognition unit 32.

The voice response unit 3 then obtains the transfer source account number and the transfer destination account number etc. from the DB server 6 based on this transaction code. The DB server 6 then retrieves a transfer source account number and a transfer destination account number etc. corresponding to the transaction code from the transaction code DB 65 and transfers this information to the voice response unit 3 (S10).

The voice playback unit 34 then extracts data inviting the custom to input an amount from the audio data storage unit 35, this data is played back as voice, and guidance is given to the customer (S11).

When the customer inputs the amount using the push buttons of the telephone in this way (S12), this number is recognized by the PB signal recognition unit 32.

After this, the voice playback unit 34 send each item of inputted information to the CTI server 4 and the CTI server 4 selects an appropriate operator based on this information. Each item, of information received via the voice playback unit 34 is then transferred to the receiving terminal 5 of the selected operator. The receiving terminal 5 receiving this information displays each item of information from the CTI server 4 at the display of the PC 53 and the PBX 2 connects the telephone 51 of receiving terminal 5 operating in unison with the CTI server 4 and the customer telephone.

Information such as the full name and address of the customer retrieved from the customer DB 61 is then displayed at the display of the PC 53, and the operator then refers to this information.

At this time, the information for the transfer source account number, transfer destination account number and transfer amount etc. that are to be designated by the customer carrying out the transaction, are all gathered together. The operator then reads out the transaction contents using this information and obtains confirmation from the customer (S13).

If the contents are incorrect, the transaction code is inputted again using voice (S9) (S10) and the amount is inputted (S12), (S13).

If there are no errors in the transaction contents, the operator operates the keyboard in such a manner that the telephone call of the customer is again connected to the voice response unit 3 by the PBX 2.

As a result, the voice response unit 3 gives guidance to the customer, using the same method as for inputting the amount, to invite the customer to indicate whether or not the transaction is to be permitted (S14). When, as a result, the customer inputs a cancel code using the telephone push buttons, this transaction is canceled and the process is complete. When the customer inputs a confirmation code using the push buttons of the telephone (S15), the PB signal recognition unit 32 recognizes this input code and the receiving terminal 5 is notified.

The transaction contents are then sent from the receiving terminal 5 to the accounts host computer 9 via the host G/W 8 and the transaction is then executed by the accounts host computer 9.

The transaction contents from the receiving terminal 5 are also transferred to the DB server 6 and registered at the record DB63 (S16). At this time, a receipt number acquired by the receiving terminal 5 from the DB server 6 is displayed on the screen of the PC 53. The operator then looks at this and informs the customer of the receipt number, and the process is complete.

According to the second embodiment described above, as with the first embodiment, transactions from the second time onwards can proceed without the customer informing the operator of information relating to the transaction code, and it is not necessary for the operator to input information relating to the transaction code using the keys. The number of information input operations for the customer and the operator can therefore be reduced and the amount of switching of connections to the receiver terminal for the customer telephone can be reduced. The corresponding operator time and the transaction processing time can then be reduced.

In the second embodiment, the transaction code is recognized at a PB recognition unit that replaces the voice recognition of the transaction name of the first embodiment. This has the advantage of being compatible with the low quality voice that sometimes occurs when portable telephones are used.

In the above embodiments a description is given of the example of electronic funds transfer transactions, with repeatedly used information relating to the transaction name and transaction codes being taken to be the transfer source account number, transfer destination account number and transfer type. However, the present invention is by no means limited in this respect, and types of transactions such as cumulative fixed term deposits are also possible providing that arbitrary information repeatedly used relating to transaction names and transaction codes is recorded in the transaction name DB 64 or the transaction code DB 65 in such a manner as to correspond to the transaction name and the transaction code.

Hybrid applications of the present invention are also possible where the first embodiment is applied to subscriber telephones and the second embodiment is applied to portable telephones.

What is claimed is:

1. An information processing system for processing transactions by telephone, comprising:

a receiving terminal, operated by an operator, which inputs customer information taken over a telephone;

means for arbitrarily designating, by the customer, a type of transaction; and storage means for storing the customer information for use in repeated processings of the designated type of transaction;

wherein, for transactions carried out repeatedly, identifying information indicating the type of transaction designated by the customer at the time of transaction and information relating to the designated type of transaction are stored in said storage means in such a manner as to correspond with each other;

wherein in subsequent transactions, the customer confirms the arbitrarily designated type of transaction identifying information, and information relating to the designated type of transaction is retrieved from said storage means; and wherein further, the retrieved information is transferred to said receiving terminal.

2. The information processing system for transactions by telephone of claim 1, wherein said means for arbitrarily designating a transaction includes a voice recognition device having a voice recognition unit that recognizes specific vocabulary spoken by a customer, wherein arbitrary voice spoken by the customer over a telephone at the time of a transaction is received as identifying information designating the type of transaction.

3. The information processing system for transactions by telephone of claim 1, further comprising a voice response device having a push button signal recognition unit that recognizes a push button signal generated by a customer pushing the buttons of a telephone, wherein, at the time of a transaction, a push button signal generated by the customer is received as identifying information designating the type of transaction.

4. The information processing system for transactions by telephone of claim 1, wherein the transaction is an electronic fund s transfer transaction.

5. The information processing system for transactions by telephone of claim 2, wherein the type of transaction is an electronic funds transfer transaction.

6. The information processing system for transactions by telephone of claim 3, wherein the type of transaction is an electronic funds transfer transaction.

7. The information processing system for transactions by telephone of claim 1, wherein the customer information includes customer identity information that is confirmed using a contractor number and code number inputted by the customer.

8. The information processing system for transactions by telephone of claim 2, wherein the customer information includes customer identity information that is confirmed using a contractor number and code number inputted by the customer.

9. The information processing system for transactions by telephone of claim 3, wherein the customer information includes customer identity information that is confirmed using a contractor number and code number inputted by the customer.

10. An information processing system for processing transactions by telephone, comprising:

means for arbitrarily designating, by the customer, a type of transaction and entering customer information; and storage means for storing the customer information for use in repeated operations of the designated type of transaction, wherein information relating to the designated type of transaction are stored in said storage means in such a manner as to correspond to the designated type of transaction, wherein further for repeated operations of the designated type of transaction, the customer confirms information identifying the designated type of transaction, and the information relating to the designated type of transaction is retrieved from said storage means, and wherein further, the retrieved information is transferred to said receiving terminal.

* * * * *